United States Patent Office 2,742,123
Patented Apr. 17, 1956

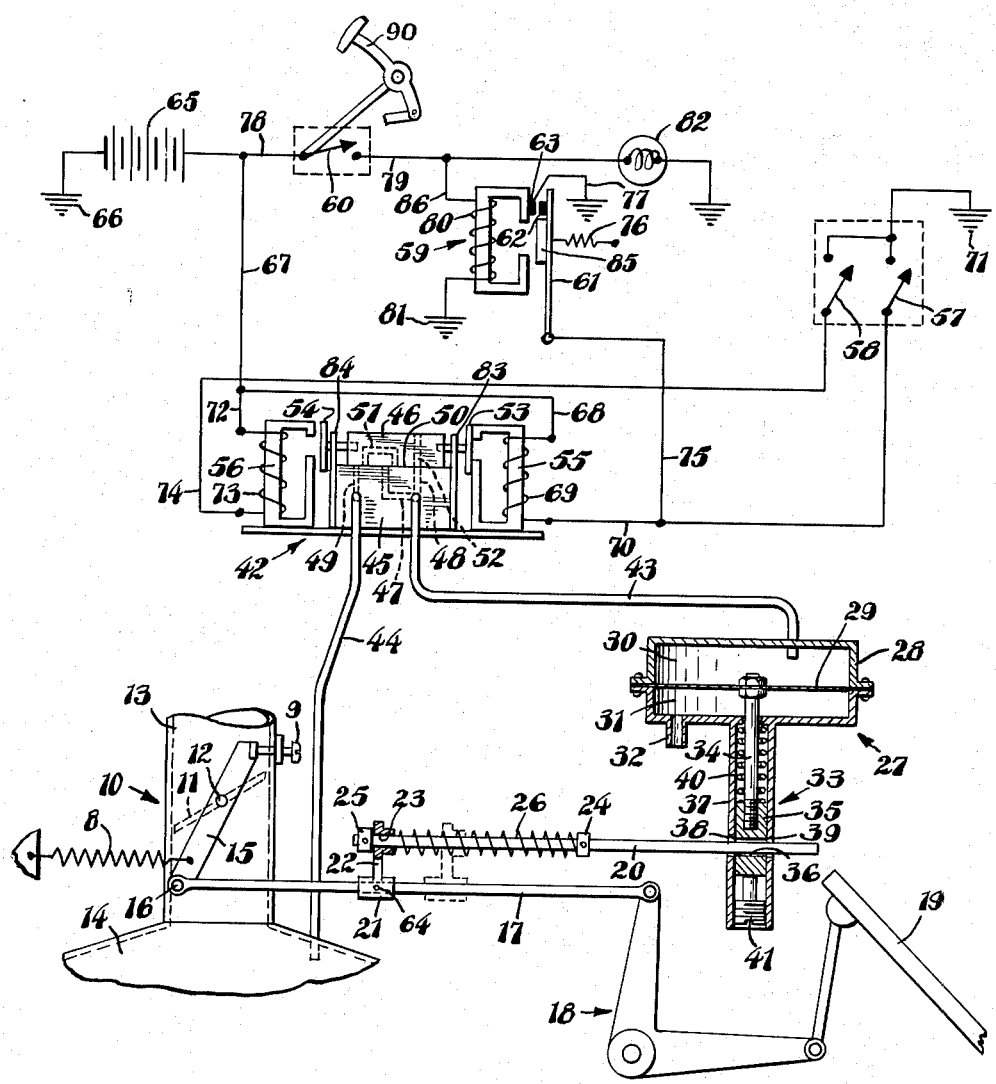

2,742,123

VACUUM POWERED THROTTLE CONTROL WITH ELECTRICALLY CONTROLLED AIR VALVE

Harold Exline, Galva, Ill.

Application September 11, 1951, Serial No. 246,143

20 Claims. (Cl. 192—3)

The object of the present invention is to provide an improved device for holding the throttle of an automotive vehicle against movement, from a preselected position, toward closed position. More particularly, it is a primary object of the present invention to provide such a device in which the retention of the throttle valve against retrograde movement is more certain and stable, while the flexibility of the control thereof is better and the cost of operation thereof is reduced, as compared with devices intended for the same general purpose and known prior to my invention.

A further object of my invention is to provide a pneumatically operated holding device for a throttle valve, or the like. A still further object of the invention is to provide novel control means for such a pneumatically operated device. A further object of the invention is to provide an improved control valve for a pneumatic motor, together with electromagnetic means for shifting such valve from one extreme position to another. A still further object of the invention is to provide, in such an organization, energizing circuits, independently controllable, and effective, upon momentary energization, to accomplish desired valve movements. A still further object is to provide, in an organization of the character described, one switch for setting the holding device, an independent switch for releasing the holding device, both of those switches being mounted on or near the steering wheel of an automotive vehicle, and a third and independent switch, together with a relay for actuating the same, controlling a circuit through which the holding device may be released, said relay being dominated by means actuated upon brake-setting movement of the conventional brake pedal of such vehicle.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

The single figure is a diagrammatic illustration of an embodiment of my invention, showing its operative association with a conventional throttle valve and accelerator pedal and the linkage therebetween.

My invention is primarily adapted for use in automobiles, trucks and similar road vehicles which, in cross-country travel, are usually operated, over long periods of time, at a substantially uniform velocity. Conventionally, vehicle speed is maintained through an accelerator pedal, and the foot of the operator, controlling that pedal, must be held substantially in one position for mile after mile while that uniform speed is maintained. My invention relates to means for relieving the operator of the necessity of thus holding the accelerator pedal in a single position over long periods of time.

Many devices intended for this general purpose have heretofore been proposed; but, for one reason or another, such previously-known devices have never been widely adopted. It is my belief that their failure to achieve public acceptance has been due primarily to the fact that no one such device has ever combined solid and slip-proof holding, flexibility and convenience of control, simplicity of construction and installation, the capacity for sudden and free acceleration, together with the capacity for returning to the same preselected setting, upon release of the accelerator pedal, without attention from the operator, and economy of operation. According to the present invention, all of these characteristics are combined in a single mechanism.

In the drawing, I have fragmentarily illustrated, at 10, the fuel feed control of a conventional internal combustion engine such as is customarily used in automotive road vehicles. Such mechanism comprises a conventional butterfly-type throttle valve 11 mounted for rotation about the axis of a trunnion 12 spanning the conduit 13 through which a combustible mixture passes from a conventional carburetor (not shown) to the intake manifold 14 of the engine. In accordance with conventional practice, a lever 15 is fixed to the trunnion 12 and has pivotally connected to one arm thereof, as at 16, one end of a link 17 whose opposite end is pivoted to one arm of a bell crank lever 18, the opposite arm of which is linked to a conventional accelerator pedal 19. A spring 8 connected to the lever 15 resiliently urges the valve 11 toward closed position; and the opposite arm of said lever is adapted to engage an adjustable screw 9 for limiting the movement of the valve 11 toward closed position, to provide for idle engine operation.

According to the present invention, a rod or member 20 has one end supported from the link 17 through a sleeve 21 adjustably mounted on said link and adapted to be held in adjusted position with respect thereto by means of a set screw 64, or the like. The sleeve 21 is provided with an arm 22 formed at its remote end with a bore 23 in which the member 20 is slidably supported. Abutment collars 24 and 25 are adjustably fixed, at spaced points, upon the rod 20; and a coiled spring 26 is sleeved on said rod and confined between the abutment 24 and the end of the arm 22, constantly urging the rod toward the right, with respect to the arm 22, as viewed in the drawing. The abutment 25 is normally engaged solidly by the end of the arm 22, whereby the rod 17 is restrained against movement, relative to the rod 20, in a valve-closing direction.

A pneumatic motor 27, comprising a two-part housing 28 divided by a movable wall such as a diaphragm 29 into two variable-volume compartments or chambers 30 and 31, is fixedly mounted, relative to the conduit 13, at a convenient point. The chamber 31 is in open communication with the atmosphere through a port 32.

A brake or holder device, indicated generally by the reference numeral 33, is, in the illustrated embodiment of the invention, integrally associated with the motor 27. Such device comprises a stem 34 supported from the diaphragm 29 to move therewith and carrying a head or shoe 35 provided with a transaxial bore 36 therethrough. The stem 34 and head 35 are mounted to reciprocate within a guide 37. The guide 37 is formed with a pair of aligned apertures 38 and 39 with which the bore 36 normally registers; and a spring 40 preferably urges the head in a direction to move the diaphragm 29 in such a direction as to enlarge the chamber 30. Preferably, I provide an abutment screw 41, adjustably threadedly mounted in the bottom of the guide 37, to stop the head 35 at a position in which its bore 36 accurately registers with the apertures 38 and 39.

The diameters of the bore 36 and apertures 38 and 39 will somewhat exceed the diameter of the rod 20; and the rod 20 is mounted to penetrate, and be supported in, said bore and apertures, for free axial sliding movement therein, when the parts are in their illustrated positions.

Thus it will be seen that, as the accelerator pedal 19 is moved, the rod 20 will be caused to slide in the brake mechanism, following accurately the movements of the link 17. When the pedal is depressed, the arm 22 will act upon the spring 26 which, in turn, will act upon the abutment 24 to cause the rod 20 to move toward the right with the link 17; and when the pedal is released, the arm 22 will act upon the abutment 25, as the link 17 is moved toward the left by the spring 8, to move the rod 20 toward the left with the link 17.

Means for controlling the operation of the motor 27 is indicated generally at 42. A conduit 43 is connected with the chamber 30 and a conduit 44 is connected with the interior of the intake manifold 14. A block 45 is stationarily mounted upon any suitable base and is formed to provide a surface 50 mating with a corresponding surface of a valve member 46 which is mounted for sliding movement relative to the block. In the illustrated embodiment of the invention, which I presently consider to be preferable, the surface 50 and the mating surface of the valve member 46 are plane and are arranged in a horizontal attitude, and the valve member 46 moves rectilinearly relative to the block 45; but it will be obvious that variations of this arrangement might be adopted. In all events, the valve member will be inherently stable, by which I mean that it will retain any position which it may assume relative to the block 45 until, by some external force, it is moved to a new position, which it will then maintain.

The block 45 is formed with a passage 47, the mouth of which opens through the surface 50 and the opposite end of which is connected to the conduit 43. Said block is formed with a further passage 48 whose mouth opens through the surface 50 at a point spaced, in the line of movement of the valve member 46, from the mouth of the passage 47, and whose opposite end is likewise connected to the conduit 43. A further passage 49 is formed in the block 45 with its mouth opening through the surface 50 at a point oppositely spaced from the mouth of the passage 47, and its opposite end is connected to the conduit 44.

The valve member 46, in turn, is formed with a passage 51 opening through the surface of said valve member which mates with the surface 50 and so proportioned and designed that, in one position of the valve member, said passage 51 spans, and establishes communication between, the mouths of the passages 47 and 49. The valve member 46 is further provided with a passage 52 whose mouth opens through said mating surface and whose opposite end is always open to the atmosphere. The passages 51 and 52 are so related that, when the passage 51 establishes communication between the passages 47 and 49, the mouth of the passage 52 will be sealed against the surface 50 and, when the passage 52 registers with the passage 48, the passage 51 will be sealed against said surface 50.

In the illustrated embodiment of the invention, armatures 53 and 54 are carried at opposite ends of the valve member 46, and electromagnets 55 and 56 are stationarily arranged adjacent said armatures, respectively. As shown, the valve member 46 is guided in its movements by brackets 83 and 84 fixed to the ends of the block 45 and having a slidable engagement with the stems of the respective armatures 53 and 54.

For energizing the electromagnets 55 and 56, any suitable source of electrical energy, such as the conventional automobile storage battery 65, may be used. I have illustrated a one-wire system in which one side of the battery 65 is grounded as at 66, and an energizing circuit for the magnet 55 may be traced through wires 67 and 68 to the winding 69 for said magnet 55 and thence through wire 70 and switch 57 to ground 71. A parallel circuit for the magnet 56 leads from the battery 65 through wires 67 and 72 to winding 73 and thence through wire 74 and switch 58 to ground 71. The switches 57 and 58 may be conventional button-type switches, normally resiliently held open, and they will be mounted at a point of maximum accessibility as, for instance, upon or closely adjacent to the steering wheel of the vehicle in which the present system is installed.

When it is desired to hold the throttle against retrograde movement from a predetermined adjustment, the accelerator pedal 19 is depressed to an optimum position corresponding to the desired vehicle speed. Through the spring 26, the rod 20 will be correspondingly moved relative to the brake device 33, the spring holding the abutment collar 25 firmly against the forward face of the arm 22. Now, the switch 58 is momentarily depressed to establish the energizing circuit above described through the winding 73. Thereby, the armature 54 is attracted to the magnet 56, thus shifting the valve member 46 toward the left to a position in which the passage 51 establishes communication between the passages 47 and 49. Now, the chamber 30 is in open communication with the interior of the intake manifold 14 which is, of course, a region of subatmospheric pressure. The chamber 30 is thus partially evacuated, whereby atmospheric pressure impressed upon the lower surface of the diaphragm 29 will be caused to lift the shoe 35 strongly against the tendency of the spring 40. The bore 36 is thus misaligned with the apertures 38 and 39, so that the rod 20 will be firmly clamped in its selected position. By properly proportioning the parts of the motor 27 and the brake device 33, a very strong, firm grip upon the rod 20 may thus be established, whereby said rod will be restrained against any movement whatever under the influence of any stresses to which it may be expected to be subjected.

The switch 58 need be only momentarily closed, as stated above, since the inherent stability of the valve 46 will hold it in position to maintain the communication between the chamber 30 and the manifold 14 until it is externally shifted. Thus, the battery 65 is protected against undue drain such as inevitably occurs in a system in which the holding device is a solenoid or some other electrically energized motor, as proposed in many forms of previously-known devices intended for accomplishing the general functions of the present invention.

If, for any reason, the operator chooses to accelerate vehicle velocity temporarily, it will be seen that the accelerator pedal 19 may be freely depressed, in spite of the energization of the brake 33. Such depression merely carries the arm 22 toward the right, compressing the spring 26 without affecting the position of the rod 20. When, thereafter, the pedal 19 is released, the spring 8 and the spring 26 will cooperate to return the link 17, throttle valve 11 and arm 22 toward the left until the arm 22 strikes the abutment collar 25, which will arrest further movement of the throttle and control element toward valve-closed position.

If, however, the operator desires to decelerate, he has only to touch the button of switch 57, thereby closing the energizing circuit for the winding 69 of the magnet 55, momentarily. Instantly, the armature 53 will be attracted to the magnet 55, thus shifting the valve member 46 into its illustrated position, in which the chamber 30 is placed in communication with the atmosphere, and the spring 40 will shift the head 35 to its illustrated position, thus releasing the rod 20 and permitting the spring 8 to return the valve 11 to its illustrated position.

While the switch 57 is so positioned that it can be instantaneously operated by the driver, without thought in an emergency, I deem it desirable to provide additional safety means whereby the brake device 33 will be automatically released whenever the vehicle operator moves the conventional brake pedal in a brake-applying direction. To that end, I provide an additional energizing circuit for the coil 69, independent of the switch 57. A wire 75 leads from the wire 70 to a switch arm 61 carrying a contactor 62 normally held out of contact with a contactor 63 by a spring 76. A wire 77 leads from the contactor 63 to ground. The arm 61 carries an armature 85 with which is operatively associated an electromagnet 59. A wire 78 leads from the hot side of battery 65 to a normally open switch 60 from which a wire 79 and a wire 86 lead to the winding 80 for the magnet 59 whose opposite end is connected to ground at 81. The switch 60 is suitably connected to the vehicle brake pedal diagrammatically indicated at 90 to be closed upon movement of said pedal in a brake-applying direction. As illustrated, the switch 60 is, in fact, the control switch for the conventional stop light 82. When that switch is closed, the coil 80 for the magnet 59 is energized, the armature 85 is attracted to the magnet, and the contactors 62 and 63 are closed to establish an energizing circuit for the magnet 55 through wire 67, wire 68, winding 69, wire 70, wire 75, switch arm 61, contactor 62, contactor 63 and wire 77 to ground, thereby shifting the valve member 46 to its illustrated position to release the rod 20 in the manner above described.

It is important that, in the system disclosed herein, retention of the throttle valve against retrograde movement is accomplished through the medium of a fluid motor, drawing its actuating power from a source conventionally present in any automotive vehicle, but that the application of that power to the holding element is electrically controlled through devices which require only momentary electrical energization to perform their intended functions. In such an arrangement, the holding capacity at ordinary cruising speeds is much more powerful than can be realized from an electromagnet or solenoid type of holder. Consequently, the rod 20 and the clamping devices may be quite smooth, so that, when the holding device is not energized, there will be no possibility of interference with free operation of the conventional throttle-control mechanism. When electromagnetic holding devices are used, roughening of the clamping parts is almost invariably found to be necessary, if the throttle valve is to be held firmly when the device is active; and in mechanical holding devices, pronounced serration of the retaining parts has been found to be essential. Additionally, fluid motor construction makes possible a longer stroke of the holding parts without loss of holding force, than is possible with electromagnetic holding devices. Thus delicacy of adjustment is rendered unnecessary in a device of the character disclosed herein.

Not the least of the advantages of the present system, of course, is the fact that only momentary energization of the electrically actuated parts of the system is required, so that the system places no such heavy drain upon the battery as is inevitable in systems which depend upon electromagnetic holders.

It will be obvious, of course, that the conduit 44 might be connected to any other region of subatmospheric pressure, without substantially affecting the disclosed system; and that, by slight and obvious modifications in the structure of the motor 27, the system could be adapted for use in an arrangement in which the conduit 44 communicates, instead, with a region of superatmospheric pressure. Other slight revisions would make it possible to control the position of the shoe 35 through the medium of liquid pressure; and all such revisions are, of course, within the scope of my invention, as defined in the following claims.

I claim as my invention:

1. For use with an engine provided with a throttle valve resiliently urged toward closed position, and a control element movable with said throttle valve, the invention comprising a member adapted for connection to such a control element, a brake operatively associated with said member and shiftable between restraining and non-restraining positions relative to said member, a fluid motor operatively connected to shift said brake, valve means connected to control the flow of motive fluid relative to said motor, a first electromagnet arranged to shift said valve means, when energized, to actuate said motor to move said brake to member-restraining position, a second electromagnet arranged to shift said valve means, when energized, to actuate said motor to move said brake to non-restraining position, parallel energizing circuits for said magnets, a switch connected in each of said circuits, and means resiliently holding each of said switches normally open.

2. The invention of claim 1 including a further energizing circuit for said second electromagnet independent of said switches, and a further normally-open switch connected in said further circuit.

3. The invention of claim 2 including electromagnetic means operable, upon energization, to close said further switch, an independent energizing circuit for said electromagnetic means, and a normally-open switch dominating said independent circuit.

4. For use with an internal combustion engine having an intake manifold and a throttle valve controlling fuel flow to said manifold, means resiliently urging said valve toward closed position, and a control element connected to move with said valve, the invention comprising a member adapted for connection to such a control element, a brake including an element operatively associated with said member and shiftable between restraining and non-restraining positions relative to said member, a fluid motor including a variable-volume chamber having a movable wall operatively connected to shift said shiftable element, conduit means connected with said chamber and adapted to establish communication between said chamber and such a manifold, valve means connected in said conduit means to control fluid flow therethrough, said valve means including a valve member shiftable between a first position establishing communication between said chamber and said manifold and a second position establishing communication between said chamber and the atmosphere, a first electromagnet associated with said valve member and operative, upon energization, to shift said valve member to said first position, a second electromagnet associated with said valve member and operative, upon energization, to shift said valve member to said second position, parallel energizing circuits for said electromagnets, and a separate switch for each of said energizing circuits.

5. The invention of claim 4 including a further energizing circuit for said second electromagnet independent of said switches, and a further, normally-open switch dominating said further circuit.

6. Retainer means for holding the throttle valve of an automotive vehicle against movement beyond a predetermined setting toward closed position, comprising a member, means providing a one-way connection between said member and said throttle valve positively restricting movement of said throttle valve toward closed position beyond a predetermined setting without corresponding movement of said member while permitting movement of said throttle valve toward open position beyond such setting without corresponding movement of said member, a brake operatively associated with said member to restrain said member, when said brake is actuated, against movement, pneumatic means for actuating said brake, and electric means dominating said pneumatic means.

7. The retainer means of claim 6 in which said pneumatic means is a vacuum motor, and including conduit means connecting said motor with a vehicle engine intake manifold, valve means connected in said conduit means to control fluid flow therethrough, and electric means dominating said motor and including two independently-operable switches respectively acting to shift said valve means to opposite positions.

8. Retainer means for holding the throttle valve of an automotive vehicle against movement beyond a predetermined setting toward closed position, comprising a member, means providing a one-way connection between said member and said throttle valve positively restricting movement of said throttle valve toward closed position beyond a predetermined setting without corresponding movement of said member while permitting movement of said throttle valve toward open position beyond such setting without corresponding movement of said member, a brake operatively associated with said member to restrain said member, when said brake is actuated, against movement, a vacuum motor, conduit means connecting said motor with a vehicle engine intake manifold, valve means connected in said conduit means to control fluid flow therethrough, and electric means dominating said motor and including two electromagnets respectively oppositely active upon said valve means to shift the same between opposite positions, an energizing circuit for each electromagnet, and a normally-open switch in each such circuit.

9. In combination, for use with an internal combustion engine in a vehicle having a throttle control and a brake pedal, a throttle valve resiliently urged toward closed position and moving with said throttle control, a member, means providing a one-way connection between said member and said throttle valve positively restricting movement of said throttle valve toward closed position beyond a predetermined setting without corresponding movement of said member while permitting movement of said throttle valve toward open position beyond such setting without corresponding movement of said member, gripping means operatively associated with said member and acting, at times, to hold said member and said throttle valve against movement toward valve-closed position, and pneumatic means for actuating said gripping means.

10. The combination of claim 9 including means actuated by said brake pedal to render said pneumatic means ineffective.

11. The combination of claim 9 in which said pneumatic means comprises a vacuum motor, and including conduit means connected to said motor and to a region of subatmospheric pressure, valve means dominating said conduit means and including a valve member movable between a first position establishing communication between said motor and said region, and a second position establishing communication between said motor and the atmosphere, a first actuating device operatively associated with said valve member and acting, when energized, to shift said valve member to said first position, a second actuating device operatively associated with said valve member and acting, when energized, to shift said valve member to said second position, and independent means for energizing said respective actuating devices.

12. The combination of claim 11 in which each of said actuating devices is an electromagnet and said energizing means comprise separate energizing circuits for said magnets and independent switches dominating said respective circuits.

13. The combination of claim 12 in which said valve member is inherently stable and said switches are normally held resiliently open.

14. The combination of claim 9 in which said pneumatic means comprises a vacuum motor, and including conduit means connected to said motor and to a region of subatmospheric pressure, valve means dominating said conduit means and including a valve member movable between a first position establishing communication between said motor and said region, and a second position establishing communication between said motor and the atmosphere, a first electromagnet operatively associated with said valve member and acting, when energized, to shift said valve member to said first position, a second electromagnet operatively associated with said valve member and acting, when energized, to shift said valve member to said second position, said valve member being inherently stable, a first energizing circuit for said first electromagnet, a switch normally held resiliently open and dominating said first circuit, a second energizing circuit for said second electromagnet, a second switch normally held resiliently open and dominating said second circuit, and a third energizing circuit for said second electromagnet, independent of said second switch, a third normally-open switch dominating said third circuit, and means activated by brake-applying movement of said brake pedal to close said third switch.

15. The combination of claim 14 in which said last-named means comprises a third electromagnet operatively associated with said third switch and acting, when energized, to close said third switch, a fourth energizing circuit for said third electromagnet, a fourth normally-open switch dominating said fourth circuit, and means actuated by brake-applying movement of said brake pedal to close said fourth switch.

16. In a device of the class described, a pneumatic motor including a variable-volume chamber having a movable wall, a first conduit connected with said chamber, a second conduit connected with a region of non-atmospheric pressure, and valve means comprising a block and a valve member formed to provide mating, slidably associated surfaces, said block being provided with a first passage having a mouth opening through its said surface and connected at its opposite end to said first conduit; a second passage having a mouth opening through said block surface at a point spaced, in one direction in the line of slidable movement of said valve member, from the mouth of said first passage and connected at its opposite end to said first conduit, and a third passage having a mouth opening through said block surface at a point spaced, in the opposite direction in the line of slidable movement of said valve member, from the mouth of said first passage and connected at its opposite end to said second conduit, said valve member being provided with a passage opening through the mating surface of said valve member and proportioned and designed to span, and establish communication between, the mouths of said first and third block passages, in a first position of said valve member relative to said block, and said valve member further being provided with another passage opening through the mating surface of said valve member and registering with said second block passage in a second position of said valve member relative to said block, said last-named valve member passage communicating always with the atmosphere.

17. The device of claim 16 including a first electromagnet operatively associated with said valve member and effective, upon energization, to shift said valve member to said first position, a second electromagnet operatively associated with said valve member and effective, upon energization, to shift said valve member to said second position, independent energizing circuits for said electromagnets, respectively, and independent, normally-open switches respectively dominating said circuits.

18. The device of claim 17 in which said valve member is inherently stable.

19. The device of claim 18 in which said mating surfaces are horizontal and plane.

20. The device of claim 19 including armature means for said respective electromagnets carried at opposite ends of said valve member, said electromagnets being mounted respectively adjacent opposite ends of the rectilinear path of movement of said valve member, and means carried by said block and engaging said armature means to guide said valve member in its movements relative to said block.

References Cited in the file of this patent

UNITED STATES PATENTS

| 2,127,454 | Wolfe et al. | Aug. 16, 1938 |
|---|---|---|
| 2,243,354 | Musser | May 27, 1941 |
| 2,256,348 | Mosher | Sept. 16, 1941 |
| 2,270,002 | Glick | Jan. 13, 1942 |
| 2,423,006 | Chambers | June 24, 1947 |
| 2,467,485 | Krieg | Apr. 19, 1949 |
| 2,479,646 | Smith | Aug. 23, 1949 |
| 2,528,745 | Fisher | Nov. 7, 1950 |